UNITED STATES PATENT OFFICE 2,158,287

SENSITIZING SILVER HALIDE EMULSION

Walter König, Dresden, Germany, assignor, by mesne assignments, to Agfa Ansco Corporation, Binghamton, N. Y., a corporation of Delaware No Drawing. Application July 19, 1934, Serial No. 736,131. In Germany July 21, 1933

16 Claims. (Cl. 260—240)

My present invention relates to sensitizing silver halide emulsions.

One of its objects is a process of manufacturing polymethine dyes which are capable of sensitizing a silver halide emulsion. Another object are the dyes capable of sensitizing a silver halide emulsion. Further objects will be seen from the detailed specification following hereafter.

According to the present invention polymethine dyestuffs whose polymethine chain contains at least seven carbon atoms and contains as a substituent an acyloxy- or alkoxy-group are made by condensing a polymethine dyestuff of the general formula

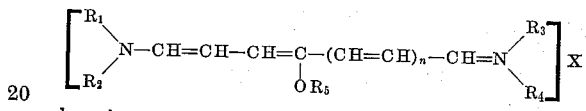

wherein

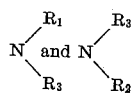

represent radicals of secondary or primary amino-groups or radicals of secondary cycloamines, $R_5$ represents acyl (including sulfoacyl) or alkyl, X represents halogen or any acid radical and $n$ represents 0, 1, 2 or 3, with a cycloammonium salt containing a reactive methyl group, or with a corresponding methylene base, in the presence of a condensing agent.

In this manner there are obtained dyestuffs which may be presumed to correspond with the general formula A

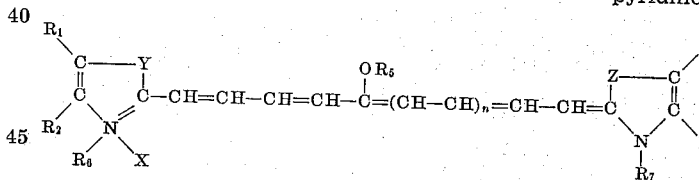

or with the general formula B

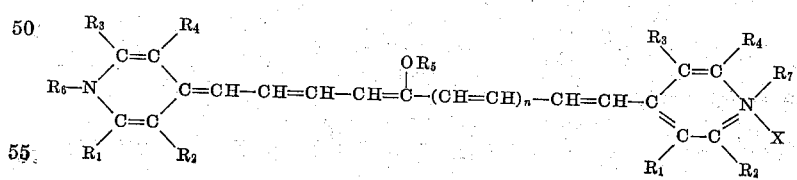

In the formulae A and B, Y and Z represent sulfur, selenium, oxygen or a group

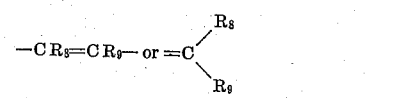

(Y and Z may be the same or different);
$R_1$, $R_2$, $R_3$, $R_4$ represent hydrogen, alkyl, aryl, carboxyl or alkyl-carboxyl, acyl or in some cases

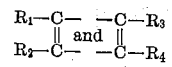

may represent an unsubstituted or substituted phenylene, naphthylene or other polynuclear arylene group; as suitable substituents for the arylene groups there come into consideration alkyl, aryl, alkoxy, thioalkyl, substituted or unsubstituted amino-groups, free or esterified carboxylic or sulfonic acid groups;
$R_5$ represents acyl, aralcyl, alkyl- or aryl-sulfonyl or alkyl;
$R_6$ and $R_7$ represent alkyl or aryl;
$R_8$ and $R_9$ represent alkyl, aryl, aralkyl or hydrogen;
X represents an inorganic or organic acid radical, for example Cl, Br, I, $ClO_4$, $CH_3$—$C_6H_4$—$SO_3$, $CH_3$—$SO_4$, $C_2H_5$—$SO_4$; and $n$ represents 0, 1, 2 or 3.

In carrying out the invention, there may be used quaternary salts of all heterocyclic bases containing a reactive methyl group or the corresponding methylene bases, particularly the quaternary salts of mono- and polynuclear thiazoles, selenazoles and of 2- and 4-methylquinolines, pyridines, pyrolenines and indolenines. Examples of suitable condensing agents are pyridine bases, aliphatic bases, for example, triethanolamine, alcohol and piperidine, alcohol and sodium acetate, acetic anhydride alone or together with sodium acetate or potassium acetate.

The polymethine dyestuffs of the general formula

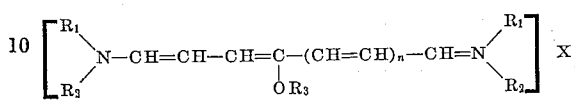

constituting intermediate products for the manufacture of the dyestuffs of formulae A and B can be made by reaction between secondary or primary amines and furfurol or its vinylene-homologues such as furfur-acrolein and so on, followed by acylation (such as benzoylation) or alkylation of the product.

The polymethine dyestuffs made in accordance with the invention are excellent photographic sensitizers for the infra-red region of the spectrum; as compared with the hitherto known sensitizers for the infra-red, their range of sensitization is considerably displaced towards the long wave region. In particular, with these dyestuffs it is possible to produce photographic silver halide emulsion layers which are sensitive to wave lengths exceeding $1000\mu\mu$.

The dyes are obtainable according to the desired solubility in form of the bromide, iodide, perchlorate, etc. For sensitizing a silver halide emulsion, they are used in a quantity, such as is usual for the known sensitizing dyes. This quantity may amount to about 0.5 to 1.5 milligrams per kilo of emulsion ready for being cast which contains about 9 per cent of gelatin, 4.5 per cent. of silver halide and the rest water. However, the invention is not limited to the quantities just indicated and the most suitable amount can be found in each case by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production; however, they are preferably added to the finished emulsion before casting.

The dyes may likewise be incorporated in the emulsion by bathing the finished photographic material in a bath in which the dye is dissolved. Such a treatment may be as follows: The photographic material to be sensitized is bathed in a solution containing 1 milligram of bis-[5.6-dimethoxy-3-ethyl-benzthiazole-(2)]-ε-acetyloxy-nonamethine perchlorate in 1000 cc. of an aqueous solution of methanol of 50 per cent. strength for about 5 minutes. The material is then dried, whereupon it is ready for use.

The following examples illustrate the invention:

Example 1.—Manufacture of the dyestuff (bis-[3-methyl-6-phenyl-benzthiazole-(2)]-ε-acetyl-oxy-heptamethinecyanine perchlorate).

There is first prepared the pentamethine dyestuff of the formula

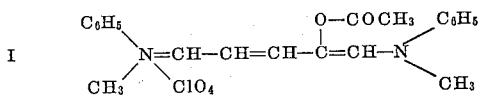

by heating the Schiff's unstable pentamethine perchlorate from furfurol and 2 molecular proportions of monomethylaniline which forms pure red solutions and is described more precisely by Ebert (Dissertation Dresden 1913) in about five times its weight of acetic anhydride for about 1 hour at about 80° C. The new dyestuff is then precipitated with ether and may be recrystallized from acetic anhydride. In comparison with the red dyestuff containing a free hydroxyl group, which is quite useless for dyeing purposes, the new product is very stable; it dyes tannin-mordanted cotton reddish-yellow, that is to say, almost exactly the same shade as the analogous pentamethine dyestuff unsubstituted at the mesochrome. Accordingly its absorption bands are almost exactly in the same position as those of the latter.

The pentamethine dyestuff can also be prepared by the action of acetyl chloride in presence of pyridine. Thus, for example, the chloride corresponding to the pentamethine dyestuff can be obtained by dissolving the red chloride of the monomethylaniline-furfurol dyestuff in about 20 parts of pyridine, cooling the solution to $-20°$ C., adding somewhat more than 1 molecular proportion of acetyl chloride and subsequently introducing the reaction solution into ice water saturated with sodium chloride and acidified with hydrogen chloride.

For the manufacture of the heptamethine dyestuff (heptacarbocyanine dyestuff) of the probable formula:

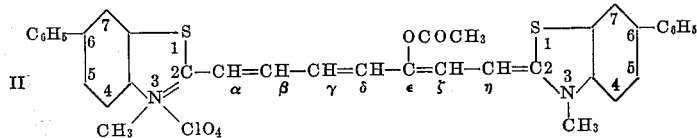

1 molecular proportion of the pentamethine dyestuff perchlorate of Formula I is dissolved in about 20 times its weight of pure pyridine and combined at ordinary temperature with about 2.5 molecular proportions of the quaternary salt of the formula:

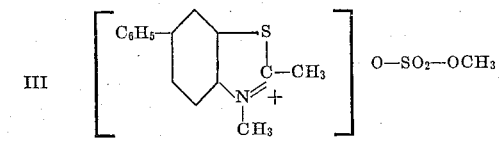

(obtainable from para-aminodiphenyl by means of $S_2Cl_2$ according to the Herz method by way of the ortho-mercapto derivative). The solution, which is at first orange, becomes bluish green and finally reddish-blue. After about half an hour, the solution is mixed with one and a half times its volume of ethanol, whereupon the dyestuff precipitates in the form of crystals having a green lustre. The green solution of the dyestuff in methanol has an absorption maximum at about $740\mu\mu$ and a second band at about $430\mu\mu$.

A fine grained silver bromide emulsion of middle sensitivity and containing about 2 per cent of silver iodide is sensitized to waves from about 650 to $900\mu\mu$ with a maximum at about $830\mu\mu$.

Example 2.—Manufacture of the dyestuff (bis-

[3-methyl-6-phenyl-4-chloro-benzthiazole-(2)]-ε-acetyloxy-heptamethinecyanine perchlorate) of the general formula

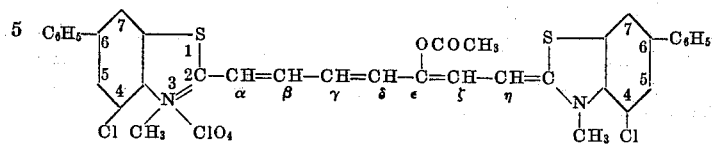

IV

This dichloro-derivative of the dyestuff represented by Formula II can be obtained in a manner analogous to that described in Example 1 from the quaternary salt of the probable formula:

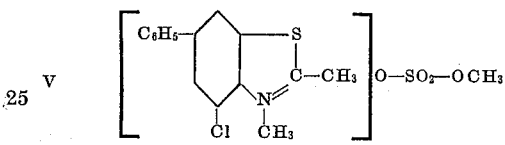

V

This salt can be synthesized from a by-product obtained in the preparation of the salt represented by Formula III in a manner analogous to that by which the said salt is made.

The main band of the new dyestuff, which forms olive-green crystals, is displaced by a few μμ bathochromically as compared with that of the dyestuff II.

A fine grained silver bromide emulsion of middle sensitivity and containing about 2 per cent of silver iodide shows a maximum of sensitivity at about 830 μμ when sensitized with the dye.

*Example 3.*—Manufacture of the dyestuff (bis-[3-methyl-6-phenyl-benzthiole-(2)]-ε-acetyloxy-nonamethinecyanine chloride).

The heptamethine dyestuff of the formula

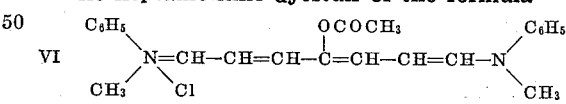

VI is first prepared by dissolving the violet-blue condensation product from furfuracrolein, 2 molecular proportions of monomethylaniline and 1 molecular proportion of hydrogen chloride described by König (Journ. prakt. Chem. (2), vol. 88, page 215), in twenty times its weight of strongly cooled pyridine, and acetylating it with about 1 molecular proportion of acetyl chloride. The product is worked up in the manner described in Example 1. The dyestuff salt is thus obtained as violet-red needles having a blue lustre, which dissolve in alcohol to a blue-red solution and dye tannin-mordanted cotton violet.

The corresponding perchlorate can be obtained in a similar manner by causing pyridine and acetic anhydride to act on the perchlorate of the dyestuff containing free hydroxyl.

For the manufacture of the dyestuff of the following probable formula:

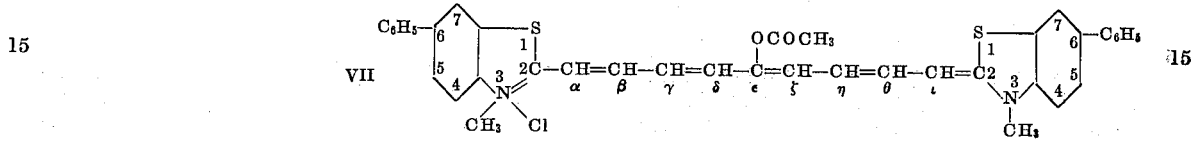

VII 1 molecular proportion of the violet heptamethine dyestuff chloride VI is caused to react in the manner already described with about 2.5 molecular proportions of the salt III. The color of the solution changes from violet to olive green. After a short time the whole is diluted with an equal volume of ethanol, whereupon the dyestuff is precipitated in the form of small grey-green crystals. It dissolves in pyridine to a faintly green solution having an absorption maximum between 900 and 1000 μμ; sharp, only slightly persistent bands are present in the visible spectrum at about 480 and 450 μμ.

A fine grained silver bromide emulsion of middle sensitivity and containing about 2 per cent of silver iodide is sensitized to waves from about 750 to 1000 μμ with a maximum at about 925 μμ.

*Example 4.*—Manufacture of the dyestuff (bis-[3-methyl-6- phenyl -benzthiole - (2) ]- ε- benzoyloxy-nonamethinecyanine.

The heptamethine dyestuff of the following probable formula:

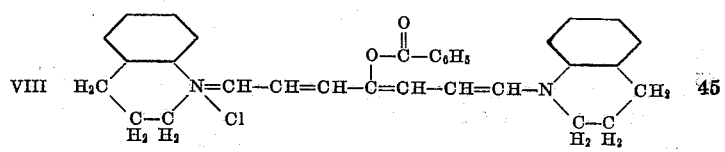

VIII is first prepared by shaking 1 gram of the green-blue dyestuff chloride obtainable from furfuracrolein, tetrahydroquinoline and hydrochloric acid according to the process of König (Journ. prakt. Chem. (2), vol. 88, page 216) with 15 times its weight of cooled pyridine until it is completely dissolved, whereupon the hydroxyl group is benzoylated by gradual addition of 1 molecular proportion of benzoyl chloride. The dyestuff can be isolated in the usual manner by pouring the reaction mixture into a saturated solution of sodium chloride acidified with hydrochloric acid and may then be recrystallized from alcohol or acetone. It forms small needles having a blue lustre and dyes tannin-mordanted cotton reddish-blue.

The pure blue chloride VIII is then caused to react in solution in pyridine with the salt III. There is thus obtained the dyestuff of the following probable formula:

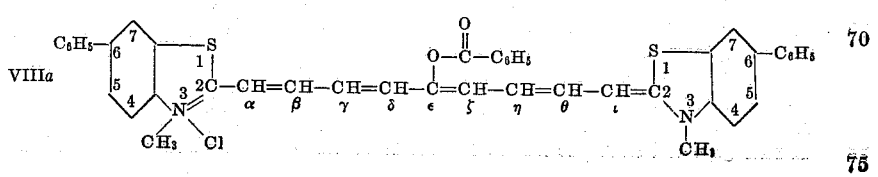

VIIIa in the form of small green-gold, glittering crystals whose absorption properties are very similar to those of dyestuff VII.

A fine grained silver bromide emulsion of middle sensitivity and containing about 2 per cent of silver iodide is sensitized to waves from about 750 to 1000μμ with a maximum at about 925μμ.

*Example 5.*—Manufacture of the dyestuff (bis-[3-methyl-6-phenyl-benzthiole-(2)] - ε - acetyl-oxy-undecamethinecyanine (perchlorate).

The nonamethine dyestuff of the following formula

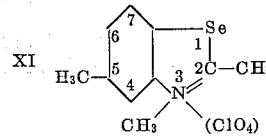

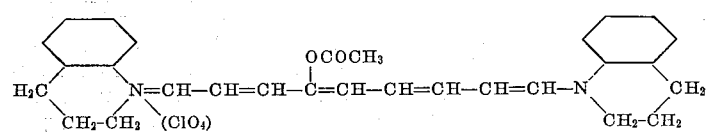

is first made in the following manner: By condensation of 1 molecular proportion of strepto-divinylene-furol (5-(α-furyl)-pentadienal-(1)) (cf. König, Berichte, 1925, vol. 58, page 2564) with 2 molecular proportions of tetrahydroquinoline and 1 molecular proportion of perchloric acid in solution in cooled acetone, there is first obtained the non-acetylated pure green dyestuff corresponding with the acetylated dyestuff of Formula IX. It is converted into the acetylated dyestuff IX by treatment with acetic anhydride in solution in pyridine, the reaction mixture being strongly cooled during the operation with carbon dioxide snow and ether. The dyestuff is then precipitated from the blue-green solution by the addition of ether in the form of small fine needles which dissolve readily in alcohol to a solution having the color of malachite green.

The strepto-pentavinylene-thiocyanine dyestuff (undecacarbocyanine dyestuff) of the probable formula:

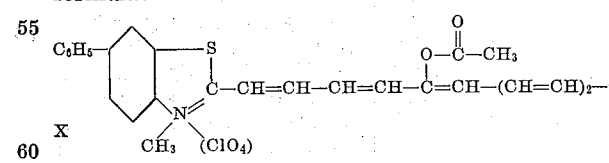

is obtained in the form of green-black microcrystals by causing the salt III to react in the manner described in Example 1 with the strepto-nonamethine dyestuff salt of Formula IX and then diluting the solution, whose color changes from blue-green through green to pure yellow, with ethyl alcohol. In spite of its peculiar, dark superficial color, the product dissolves in pyridine to a pure yellow solution, that is to say, it is a pronounced "dyestuff of higher order". The absorption maximum of the solution in pyridine has not yet been exactly determined, but lies above 1000μμ; in the visible part of the spectrum, bands can be observed at about 525, 489 and 459μμ.

A fine grained silver bromide emulsion of middle sensitivity and containing about 2 per cent of silver iodide is sensitized to waves from about 950 to 1150μμ with a maximum at about 1050μμ.

*Example 6.*—Manufacture of the dyestuff (bis-[3.5 - dimethyl-benzselenazole-(2)]-ε - acetyloxy-nonamethinecyanine perchlorate) of the probable formula

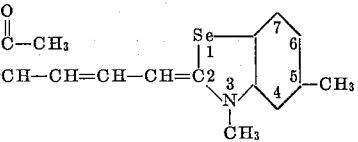

The dyestuff can be obtained in the usual manner from the violet heptamethine dyestuff perchlorate VI and the 1,2,6-trimethyl-benzselen-azolium bromide described by Julius (Dissertation, Dresden 1928), in the form of small dark crystals. The secondary bands of the greenish solution of the dyestuff in a mixture of pyridine and methanol lie in the visible region at about 476 and 444μμ.

A fine grained silver bromide emulsion of middle sensitivity and containing about 2 per cent of silver iodide shows a maximum of sensitivity at about 925μμ when sensitized with the dye.

*Example 7.*—The dyestuff bis-[1-dimethyl-3-methyl-indole-(2)] - ε - acetyloxy - nonamethine-cyanine chloride of the probable formula

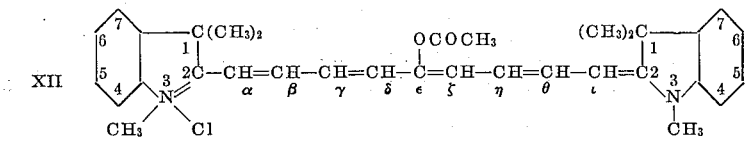

is obtained by causing about 2.5 molecular proportions of 1,2,3,3-tetramethylindoleninium iodide to react in pyridine solution with 1 molecular proportion of the dyestuff of the formula

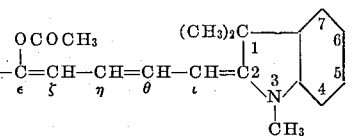

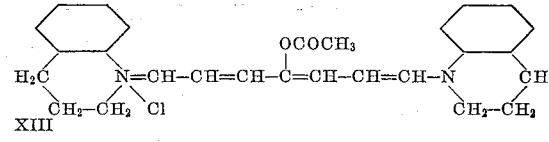

which can be obtained analogously to the dyestuff VIII from furfuracrolein with subsequent acetylation. The color of the reaction mixture changes to green, whereupon by the addition of alcohol small greenish-black crystals are precipitated having a main absorption in the infra-red and secondary bands in the visible spectrum at about 475 and 442μμ.

A fine grained silver bromide emulsion of middle sensitivity and containing about 2 per cent of silver iodide is sensitized to waves from about 750 to 950μμ with a maximum at about 900μμ.

*Example 8.*—For producing bis-[3-ethyl-5.6-dimethoxy - benzthiazole - (2)]-ε-acetyloxy-nonamethine-cyanine perchlorate corresponding with the formula

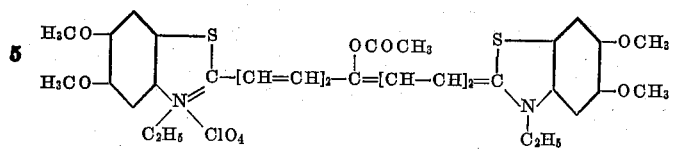

there is prepared from α-furylacrolein, perchloric acid and tetra-hydroquinoline the oxy-azomethine dye which is acetyled with somewhat more than the calculated amount of acetic anhydride in pyridine solution.

2 grams of the acetyl compound corresponding probably with the formula

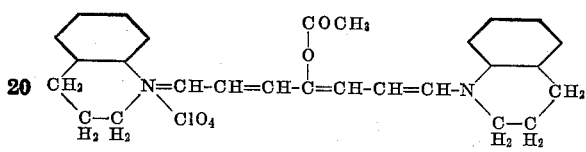

are dissolved in 40 cc. of dry pyridine with 2 grams of 2-methyl-5,6-dimethoxybenzthiazole diethylsulfate. The mixture assumes slowly a dark-blue color. After some time, there are added 2 cc. of triethanolamine, the mixture is stirred and the color changes into green. Then there are added about 60 cc. of alcohol and after continuing with stirring the dye separates in copper-colored crystals.

A fine grained silver bromide emulsion of middle sensitivity and containing about 2 per cent of silver iodide is sensitized to waves from about 600 to 1100μμ with a maximum at about 950μμ.

*Example 9.*—1 gram of the azomethine compound prepared as described in Example 8 and corresponding with the formula

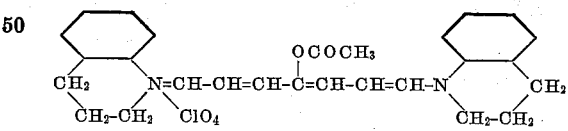

is dissolved with 2 grams of lepidine dimethylsulfate in about 20 cc. of pyridine. The mixture gradually assumes a green color. Now, there are added 1 cc. of diethylamine, and after a short period of time about 20 cc. of alcohol. After some time the bis-[1-methyl-quinoline-(4)]-ε-acetyloxy-nonamethinecyanine perchlorate corresponding probably with the formula

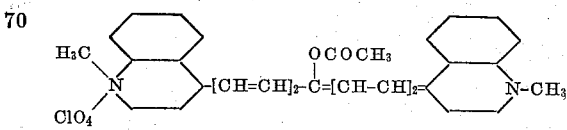

separates as a brown red crystal powder.

A fine grained silver bromide emulsion of middle sensitivity and containing about 2 per cent of silver iodide is sensitized to waves from about 750 to 1200μμ with a maximum at about 1080μμ.

*Example 10.*—0.5 gram of the azomethine dye corresponding probably with the formula

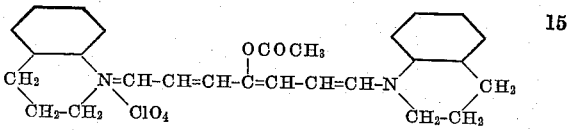

(preparation according to Example 8) is dissolved with 0.8 gram of 2-methyl-β-naphthiazole diethylsulfate in about 30 cc. of pyridine. After standing 1 hour, the solution which has assumed a blue-green color, is mixed with about 40 cc. of alcohol, whereafter an intermediate product corresponding probably with the formula

separates. 0.5 gram of this intermediate product are dissolved with the same amount of 2-methyl-6-ethoxybenzthiazole diethylsulfate in 20 cc. of pyridine while shortly boiling. On the addition of alcohol the dye bis-[3-ethyl-{naphto-4.5:2,1 thiazole}-(2)]-[3-ethyl-6-ethoxy-benzthiazole-(2)]-ε-acetyloxy-nonamethinecyanine perchlorate corresponding probably with the formula

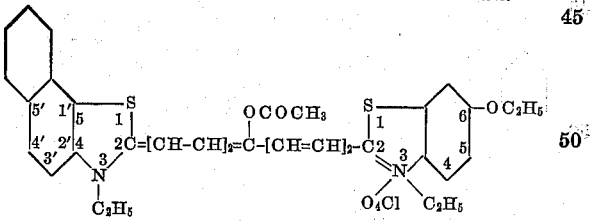

separates in the form of crystals.

A fine grained silver bromide emulsion of middle sensitivity and containing about 2 per cent of silver iodide is sensitized to waves from about 650 to 1050μμ with a maximum at about 940μμ.

*Example 11.*—For producing the dye corresponding with the formula

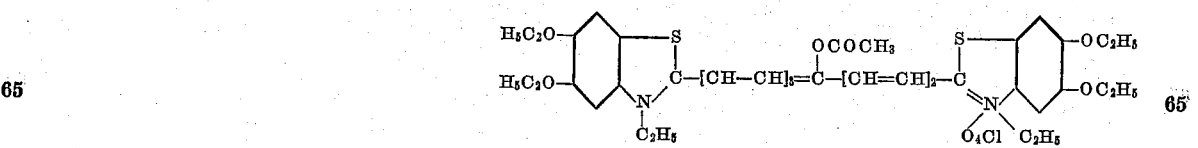

α-furylpentadienal (prepared according to König, Ber. 58, 2564) is brought to reaction with perchloric acid and tetrahydroquinoline in methanolic solution to form the azomethine dye, and the latter is acetylated with somewhat more than the calculated amount of acetic anhydride in pyridine solution.

1 gram of the acetyl compound corresponding probably with the formula $$H_2C\underset{CH_2-CH_2}{\overset{}{\diagdown}}N=CH-[CH=CH]_2-\underset{ClO_4}{\overset{OCOCH_3}{C}}=CH-CH=CH-N\underset{CH_2-CH_2}{\overset{CH_2}{\diagup}}$$

is dissolved with the same amount of 2-methyl-5,6-diethoxy-benzthiazole-diethylsulfate in 15 cc. of pyridine. The mixture assumes gradually a dark-blue color. If, after standing for 2 to 3 hours, the mixture is mixed with alcohol the intermediate product corresponding with the formula $$\underset{H_5C_2O}{\overset{H_5C_2O}{\diagdown}}\!\!\diagup\!\!\!\overset{S}{\underset{N}{\diagdown}}\!\!C-[CH=CH]_3-\underset{I}{\overset{OCOCH_3}{C}}=CH-CH=CH-N\underset{CH_2-CH_2}{\overset{CH_2}{\diagup}}$$
$$C_2H_5$$

separates, is filtered and dissolved immediately with 1 gram of 2-methyl-5,6-diethoxybenzthiazole diethylsulfate in 20 cc. of pyridine while warming cautiously. After cooling there are added about 15 drops of triethanolamine, whereupon the solution becomes green to yellow-green. On the addition of about 30 cc. of alcohol the bis-[3-ethyl-5,6-diethoxybenzthiazole-(2)]-η-acetyloxy-undecamethinecyanine perchlorate is precipitated in the form of a copper crystal powder.

A fine grained silver bromide emulsion of middle sensitivity and containing about 2 per cent of silver iodide is sensitized to waves from about 750 to 1150μμ with a maximum at about 1050μμ.

*Example 12.*—When working according to the method described in Example 11 and using quinaldine dimethylsulfate instead of the quaternary ammonium salt of 2-methyl-5,6-diethoxybenzthiazole there is obtained the intermediate product corresponding probably with the formula $$\diagup\!\!\!\!\diagdown\!\!\!\!\diagup\!\!\!\!\diagdown\underset{CH_3\ \ ClO_4}{\overset{}{N}}-[CH=CH]_3-\overset{OCOCH_3}{C}=CH-CH=CH-N\underset{C-C}{\overset{CH_2}{\diagup}}_{H_2\ H_2}$$

in the form of a green-black crystal powder. This intermediate product is dissolved in pyridine with the same quantity of quinaldine-dimethylsulfate while cautiously warming, and after cooling there are added to the mixture a few drops of diethylamine. The dark-blue solution immediately becomes green to green-yellow. After about 10 minutes alcohol is added to the mixture whereupon the formed bis-[1-methyl-quinoline-(2)]-η-acetyloxy-undecamethinecyanine perchlorate corresponding to the formula $$\diagup\!\!\!\!\diagdown\!\!\!\!\diagup\!\!\!\!\diagdown\underset{CH_3\ \ ClO_4}{\overset{}{N}}-[CH=CH]_3-\overset{OCOCH_3}{C}=[CH-CH]_2=\underset{CH_3}{\overset{}{N}}\!\!\diagdown\!\!\!\!\diagup\!\!\!\!\diagdown$$

separates gradually in the form of a black crystal powder.

A fine grained silver bromide emulsion of middle sensitivity and containing about 2 per cent of silver iodide is sensitized to waves from about 750 to 1050μμ with a maximum at about 930μμ.

*Example 13.*—The azomethine compound obtainable according to Example 8 from furfurolacrolein, perchloric acid and tetrahydroquinoline is acetylated with somewhat more than the calculated amount of butyric anhydride in pyridine solution. 0.5 gram of the dye obtained and corresponding with the formula $$\diagup\!\!\!\!\diagdown\!\!\!\!\diagup\!\!\!\!\diagdown\underset{CH_2\ \ ClO_4}{\overset{}{N}}=CH-CH=CH-\overset{OCO-CH_2-CH_2-CH_3}{C}=CH-CH=CH\text{———}N\underset{CH_2-CH_2}{\overset{CH_2}{\diagup}}$$

are dissolved with 0.7 gram of 2-methylbenzthiazole diethylsulfate in about 15 cc. of pyridine, the mixture is allowed to stand for about 1 hour at room temperature and then mixed with 30 cc. of alcohol. The formed bis-[3-ethyl-benzthiazole-(2)]-ε-butyroxy-nonamethinecyanine perchlorate separates after some time in the form of bronze-colored crystals.

A fine grained silver bromide emulsion of middle sensitivity and containing about 2 per cent of silver iodide is sensitized to waves from about 750 to 1000μμ with a maximum at about 915μμ.

Wherever occurring in the claims, the term "aryl of the benzene series" is to be read as meaning a monocyclic aryl radical containing one benzene nucleus.

What I claim is:

1. A manufacture of polymethine dyestuffs whose polymethine chain contains at least seven carbon atoms and contains an acyloxy group as a substituent by condensing a polymethine dyestuff of the general formula:

$$\left[\underset{R_2}{\overset{R_1}{\diagdown}}N-CH=CH-CH=\overset{OR_5}{C}-(CH=CH)_n-CH=N\underset{R_4}{\overset{R_3}{\diagup}}\right]X$$

wherein $$\underset{R_2}{\overset{R_1}{\diagdown}}N\diagup\quad\text{and}\quad\underset{R_4}{\overset{R_3}{\diagdown}}N\diagup$$

represent radicals selected from the group consisting of primary amines, secondary amines, and secondary cycloamines, R₅ represents acyl, X represents an anion capable of precipitating the dye n represents one from the class consisting of 0, 1 and 2, with a compound selected from the class consisting of 2-methylbenzthiazole alkyl quaternary ammonium salts, 2-methylbenzselenazole alkyl quaternary ammonium salts, 1-dimethyl-2-methylindole alkyl quaternary ammonium salts, 2-methyl quinoline alkyl quaternary ammonium salts, 4-methylquinoline alkyl quaternary ammonium salts and their methylene bases, in the presence of a condensing agent selected from the group consisting of a basic condensing agent and acetic anhydride.

2. Bis-[3.5-dimethyl-benzselenazole-(2)]-ε-acetyloxy-nonamethine-cyanine perchlorate.

3. Bis-[3-ethyl-5.6-dimethoxy-benzthiazole-(2)]-ε-acetyloxy-nonamethinecyanine perchlorate.

4. Bis-[3-ethyl-5.6-diethoxy-benzthiazole-(2)]-ε-acetyloxy-undecamethinecyanine perchlorate.

5. The process of producing the dye bis-[3.5-dimethyl-benzselenazole-(2)]-ε-acetyloxy-nonamethinecyanine perchlorate which comprises dissolving the pentamethine dye corresponding with the formula

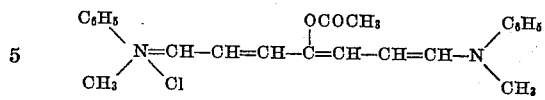

in pyridine, adding the quaternary salt of the formula

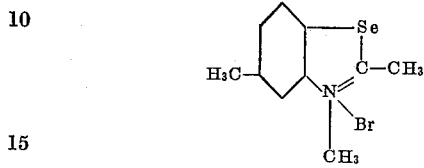

allowing the mixture to stand, diluting with alcohol and separating the formed crystals.

6. The process of producing the dye bis-[3-ethyl-5,6-dimethoxy-benzthiazole-(2)]-ε-acetyloxy-nonamethinecyanine perchlorate which comprises dissolving the dye corresponding with the formula

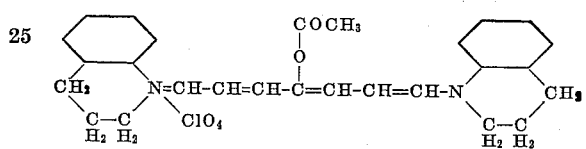

with 2-methyl-5,6-dimethoxy-benzthiazole diethylsulfate, adding after some time triethanolamine, stirring the mixture, adding alcohol after the mixture has assumed a green color, and separating the formed crystals.

7. The process of producing bis-[3-ethyl-5,6-diethoxy-benzthiazole-(2)]-ε-acetyloxy-undecamethinecyanine perchlorate which comprises dissolving the dye corresponding with the formula

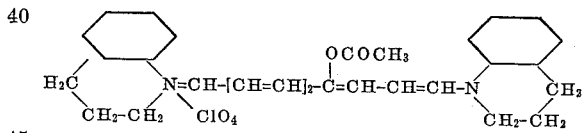

and 2-methyl-5,6-diethoxybenzthiazole diethylsulfate in pyridine, allowing the mixture to stand for about 3 hours, adding alcohol to the mixture, separating the formed dye, dissolving the formed dye with 2-methyl-5,6-diethoxybenzthiazole diethylsulfate, warming the mixture cautiously, adding after cooling, triethanolamine, adding alcohol to the mixture after it has assumed a green to yellow-green color and separating the formed crystals.

8. A polymethine dye selected from the class consisting of those corresponding with the general formula:

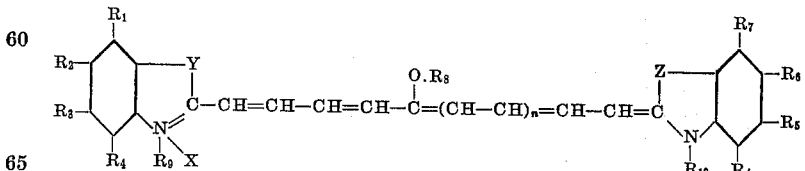

in which:

Y, Z stand for a member selected from the group consisting of

S, Se, —CH=CH—, C$\begin{smallmatrix}\text{alkyl}\\\text{alkyl}\end{smallmatrix}$ $R_4$ stands for a member of the group consisting of hydrogen and halogen, $R_1$, $R_2$, $R_3$, $R_5$, $R_6$ stand for a member selected from the group consisting of H, alkyl, alkoxy and aryl of the benzene series,

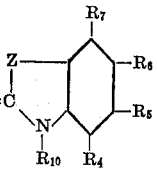

stand for an o-phenylene radical, $R_9$, $R_{10}$ stand for alkyl, $R_8$ stands for a member selected from the group consisting of aliphatic acid radicals and benzoyl, X stands for an anion capable of precipitating the dye, n stands for one from the class consisting of 0, 1 and 2, and the isomers in which Y and Z are —CH=CH— and in which at least one nucleus is linked to the methine chain in 4-position.

9. A nonamethine cyanine salt in which the hydrogen atom of one of the methenyl groups of the nonamethenyl chain is replaced by an acyloxy group.

10. A thiononamethine cyanine salt in which the hydrogen atom of the central methenyl group of the nonamethenyl chain is replaced by an acyloxy group.

11. A process for preparing a nonamethine cyanine salt comprising acting upon, in the presence of a basic condensing agent, about two molecular proportions of a cyclammonium quaternary salt containing a reactive methyl group with about one molecular proportion of a salt of an acylated condensation product of furylacrolein and a heterocyclic secondary amine.

12. A process for preparing a nonamethine cyanine salt comprising condensing, in the presence of a basic condensing agent, about two molecular proportions of a cyclammonium quaternary salt containing a reactive methyl group with one molecular proportion of a perchlorate of an acylated condensation product of furylacrolein and tetrahydroquinoline.

13. An undecamethine cyanine salt in which the hydrogen atom of one of the methenyl groups of the undecamethenyl chain is replaced by an acyloxy group.

14. A thiaundecamethine cyanine salt in which the hydrogen atom of the fifth methenyl group of the undecamethenyl chain is replaced by an acyloxy group.

15. A process for preparing an undecamethine cyanine salt comprising acting upon, in the presence of a basic condensing agent, about two molecular proportions of a cyclammonium quaternary salt containing a reactive methyl group with about one molecular proportion of a salt of an acylated condensation product of 5-(α-furyl)-pentadienal and a heterocyclic secondary amine.

16. A process for preparing an undecamethine cyanine salt comprising condensing, in the presence of a basic condensing agent, two molecular proportions of a cyclammonium quaternary salt containing a reactive methyl group with one molecular proportion of a perchlorate of an acylated condensation product of 5-(α-furyl)-pentadienal and tetrahydroquinoline.

WALTER KÖNIG.